United States Patent [19]

Volesky et al.

[11] 4,320,093
[45] Mar. 16, 1982

[54] SEPARATION OF URANIUM BY BIOSORPTION

[76] Inventors: Bohumil Volesky, 471 Berkley Ave., St. Lambert, Quebec, Canada, J4P 3E7; Marios Tsezos, 670 de Gaspe, Apt. 411, Montreal, Quebec, Canada

[21] Appl. No.: 93,406

[22] Filed: Nov. 13, 1979

[51] Int. Cl.$^3$ .............................................. C01G 43/00
[52] U.S. Cl. ....................... 423/6; 210/682; 252/427; 252/628
[58] Field of Search ................... 423/6; 252/301.1 W, 252/427; 210/28, 38 B, 38 C

[56] References Cited

U.S. PATENT DOCUMENTS

| | | | |
|---|---|---|---|
| 3,725,291 | 4/1973 | Serbus et al. | 423/6 |
| 3,993,558 | 11/1976 | Prochazka et al. | 210/28 |
| 4,021,368 | 5/1977 | Nemec et al. | 252/427 |
| 4,067,821 | 1/1978 | Votapek | 252/427 |
| 4,124,544 | 11/1978 | Prochazka et al. | 423/6 |

OTHER PUBLICATIONS

Krasil'nikov, *Nucl. Sci. Abo.*, 22 (#7), p. 1318, abs. #12798 (1968).

*Primary Examiner*—Edward A. Miller
*Attorney, Agent, or Firm*—Hirons, Rogers & Scott

[57] ABSTRACT

Uranium or thorium cations are removed from aqueous suspension or solution by treatment of the aqueous material with the biomass derived from fermentation of a fungal microorganism of the genus Rhizopus, e.g. *Rhizopus arrhizus*. The process can be utilized to treat aqueous tailings from uranium ore extraction processes, to reduce the radioactive content of the tailings prior to disposal.

5 Claims, 2 Drawing Figures

SEPARATION OF URANIUM BY BIOSORPTION

FIELD OF THE INVENTION

This invention relates to metal ion separation processes and more particularly to processes of extraction of specific ions of or containing heavy metals from waste liquids by means of biosorption.

BACKGROUND OF THE INVENTION

In processes of mining ores containing useful uranium, it is usual to adopt a process of selective leaching or uranium from the ore, followed by selective separation of uranium from the rest of the cations using ion exchange or solvent extraction. A waste slurry results, as a process by-product, which is discarded into tailings ponds. The ore may contain as little as 0.85 kg of $U_3O_8$ per ton. Consequently the amounts of waste liquid and solids to be discarded are very large. Whilst in general the disposal practices in the uranium mining and milling industry are similar to those in other mining and milling operations and are relatively efficient, uranium presents particular problems on account of its radioactive end-product and wastes, and on account of the fact that other radioactive materials are normally found associated with uranium ores.

It is estimated that only about 15% of the total radioactivity of the initially mined ore mixture leaves with the final uranium containing product, the remaining 85% being discharged in the tailings.

Another problem arises from the presence of thorium in uranium ores. Thorium is present in Canadian uranium ores in ratios ranging approximately from $ThO_2/U_3O_8=0.15$ to 0.60. All twelve known thorium isotopes are radioactive. Thorium is not generally recovered from the bearing ores, and is merely discharged with the tailings. Thus the radioactivity of the thorium adds to that of the uranium and other radionucleides and both end up in the surface waters and environment.

BRIEF DESCRIPTION OF THE PRIOR ART

In attempts to mitigate this problem, it is common practice to raise the pH of the processed ore slurry, to the 8.4–10.2 pH range, by addition of suitable inorganic bases thereto prior to its final disposal in the tailings area. At such pH levels, the hydroxides or carbonates of the heavy metals present in the waste waters should precipitate. This, however, is only a temporary solution to the environmental protection problem. Naturally occurring biological and chemical reactions result in the production of sulphuric acid from the ferrous sulphide present in the wastes, with consequent reduction of pH and resolubilization of the heavy metals.

There is, therefore, a need for a simple, inexpensive but efficient means for the extraction of radioactive contaminates such as radium, polonium, strontium, uranium and thorium residues from waste waters.

It is known to utilize the phenomenon of biosorption for extraction of materials from waste liquids. Living cells have been known to concentrate cations from their aqueous environment. Microbial biomass has been demonstrated to exhibit a selective retention of heavy metals and transient elements. It is believed that the ion exchange properties of the natural polysaccharides present in the cell walls may be at least partially responsible. Indications are that microbial cell walls possess the ability to bind with certain cations and retain them from solution. The phenomenon of biosorption, i.e. ionic species retention on microbial cell walls, is not well understood.

Biological waste water treatment is widely practiced. A number of microbial processes are presently being used by food and pharmaceutical industries. Large quantities of microbial mass result from such processes, which are discarded as waste and themselves present a disposal problem.

U.S. Pat. No. 4,021,368 Nemec et al discloses a process for retention of metal ions such as uranium from solution, using biomasses of mycelia of microorganisms of fibrous fungi, stiffened by adding to the biomass polymerizable components, effecting polymerization thereof, and mechanically granulating the product.

SUMMARY OF THE INVENTION

The present invention is based upon the discovery that the biomass produced as the result of the growth of a certain carefully selected microbial genus, namely species of the genus Rhizopus, such as *Rhizopus arrihizus* has an outstanding and totally unexpected ability for selective adsorption of uranium and thorium ions from aqueous solution or suspension. By the term "biomass" as used herein is meant the cellular product produced as a result of the culturing and growth of the microorganism.

Thus according to the present invention, there is provided a process for the selective extraction of uranium and/or thorium containing cations from aqueous solution or suspension, which comprises contacting an aqueous solution or suspension containing said cations with a biomass derived from a microorganism selected from the genus Rhizopus.

BRIEF REFERENCE TO THE DRAWINGS

FIGS. 1 and 2 of the accompanying drawings are graphic representations of the results of the specific examples given below.

DESCRIPTION OF THE PREFERRED EMBODIMENTS

Figure 1:
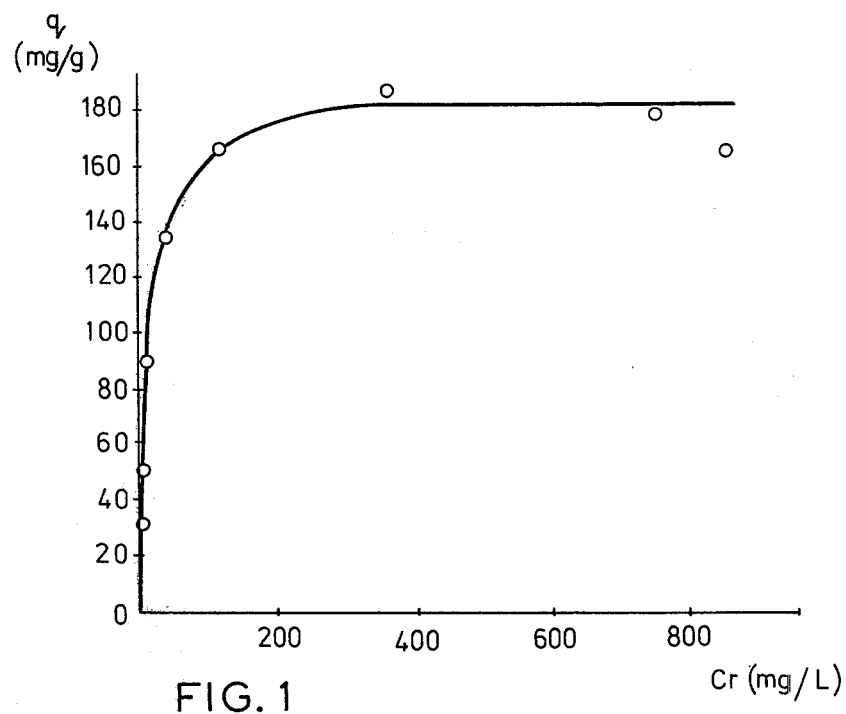

The micro-organism genus Rhizopus is a relatively common, well-known fungus, widely used to the production of enzymes. The biomass for use in the present invention is produced in the conventional way, by culturing and growth of the micro-organism under fermentation conditions and subsequent extraction of the cellular product from the fermentation medium. For use in the present invention, the biomass may be comprised of living or dead cells, or mixtures of both types. The biosorption process is not apparently a life process.

It is not presently understood why the biomass derived specifically from the growth of species from the Rhizopus genus should be so effective in removal of uranium or uranium-containing ions from solution. As will appear from the specific examples reported below, species of other genus of fungi are not effective. Many hundreds of fungi are known, including Rhizopus, Penicillium, Aspergillus and many others. Biomass from species of the genus Rhizopus, such as the species *Rhizopus arrhizus*, appears to be peculiar, for present purposes. It gives vastly and unexpectedly better results than biomass from other fungi, biomass from bacterial micro-organism such as *Pseudomonas fluorescens* and biomass derived from activated sludges, activated carbon and ion-exchange resins.

The cellular biomass material used in the process of the invention is a solid, particulate material, which is substantially insoluble in water. When extracted from the fermentation broth in which it is produced, it is suitably, but not necessarily, dried to a powdered form. In the practice of the invention, it can be used to treat the liquid solution or suspension containing the heavy metal ions in any suitable manner giving good, intimate contact of solution and biomass. Thus, the liquid and biomass may be contacted in a holding tank or vessel, under agitation for a suitable contact time, and then separated by conventional means (settling, filtration, etc.) Alternatively, the biomass may be supported on a fixed or moving bed arrangement, such as a filter bed or column, optionally with an inert supporting material or carrier, or on a polymer, and the ion-containing solution then caused to flow through the biomass. The biomass may be used as received from an industrial fermentation plant, without washing or the like, if desired.

The temperatures at which the aqueous solution or suspension contacts the biomass does not seem to be critical, over a fairly wide range of liquid water temperatures. Temperatures from 5-50° C. seem to be quite satisfactory.

The pH of the solution at the time of contact with the biomass can similarly vary over fairly wide limits, although differences in performance are observed at different pH levels. It is advisable to avoid pH extremes, and to work in the range pH 1-pH 12. The preferred pH operating range is from about ph 2.5 to about pH 7.0, and the optimum range is from pH 4 to pH 5.

The process of the invention is effective to remove uranium and thorium from aqueous solutions or suspensions thereof, in the presence of a wide variety of extraneous materials in the aqueous medium. The medium may contain other inorganic materials in solution or in suspension, e.g. clays, sands and various soluble salts as commonly encountered in mineral extracting processes. The process may also be practiced on seawater containing the aforementioned heavy metal ions.

The invention will be further described and illustrated in the following non-limitative specific examples.

EXAMPLES

Biomass from a variety of different micro-organisms was tested for its ability in selective absorption of uraniumand thorium-containing cations from aqueous solutions, and under a variety of different conditions.

The biomass samples were washed with distilled water, and dried at a temperature below 90° C. At that temperature viable cells are killed, so that no physiological uptake of uranium or thorium could occur to confuse the studies of biosorption uptake capacity.

Test solutions of uranium and thorium were obtained by dissolving the exact quantities of uranyl nitrate and thorium nitrate in distilled water, following the procedure disclosed by Z. Marcenko, "Spectrophotometric Determination of the Elements", published by John Wiley, 1976. A spectrophotometric technique developed by Marcenko was used to determine uranium and thorium concentrations in solution. In this technique, arsenazo III was used as the color developing agent, to form appropriate chelate complexes with the metal ions. The chelate complexes formed between $U^{+4}$ and $Th^{+4}$ and arsenazo III have molar absorptivities (E) respectively of $E = 1.27 \times 10^{-5}$ l per mol per cm at $\lambda = 656$ nm, and $E = 1.15 \times 10^{-5}$ l per mol per cm at $\lambda = 655$ nm.

In order to control the pH of the solutions, they were buffered with potassium biphthalate, which does not interfere wit the above colorimetric analytical technique.

The experimental procedure is to add to the initial starting solution which has a known concentration $C_o$ of uranium etc. ion, a known quantity of biomass. The biomass is mixed, and left in contact with the solution for a given period of time (in the experiments, 12 hours) to allow thorough pick-up. Then the biomass is filtered out from the suspension and the filtrate re-analysed to determine the residual concentration of test ion, to determine the amount and efficiency of the biosorption. The experiments were repeated several times using different quantities of biomass.

Separation of the biomass sample from the solution at the end of each contact period was accomplished by vacuum filtration. Sartorius membrane filters with 0.45 $\mu$m average pore diameter were used. Every filter membrane before being used was washed with distilled deionized water and the first 10 ml of the filtrate were discarded in order to minimize possibilities of change of the equilibrium uranium or thorium concentrations of the filtrate due to retention by filter membrane or complexation by washable T.O.C. (Rankin, 1975).

The experiments were all performed at 23° C. Initial solution concentrations of approximately 50 mg/l or 1000 mg/l were employed for uranium and 30 mg/l or 100 mg/l for thorium, all below the solubility limits determined by the pH values used.

Experiments were conducted at pH values of 2, 4 and 5. The selection of the pH values was based on the fact that pH=2.5 is significant for the analytical chemistry of a uranium contact system. Above pH=2.5, composite hydrolysed uranium ions of positive or negative charge predominate, while below pH=2.5 only the simple $UO_2^{+2}$ exists in solution. At pH values higher than 5, solubility of U and Th if very low. Thorium hydrolyses much less readily, yet the same pH values were used so that uranium and thorium uptake capacities could be compared at identical pH values.

The results of the experiments are presented graphically in the accompanying Figures.

FIG. 1 is a plot of the results of experiments performed at pH 4, using a starting solution of $C_o=1000$ mg/L of uranium, adding to samples thereof standard quantities of the biomass from the micro-organism *Rhizopus arrhizus*, the different points on the graph being obtained by use of different initial quantities of biomass. As horizontal axis is plotted the residual concentrate $C_r$ of uranium at the end of the experiment. As vertical axis is plotted the corresponding uranium uptake q, in milligrams per gram of biomass, calculated from the difference between $C_o$ and $C_r$, for each experiment. From this FIG. 1, it can be seen that the biomass of *Rhizopus arrhizus* gave a uranium uptake in excess of 180 mg/g at pH 4. The curve illustrates that, by use of this biomass, very low residual concentrations or uranium in solution can be obtained by treatment of the initial solution with only small amounts of this biomass.

Other experiments indicated that the biomass from *Rhizopus arrhizus* did not show any appreciable variations of uptake with pH.

Comparative experiments were conducted, following the same procedure, with other biomasses from other microorganism, and with other materials also candidates for use in similar applications. The sorption uptake capacity q, in milligrams of uranium per gram of sorption material, and the identification of the materials, is given in Table I.

The biomass of *Rhizopus arrhizus* is thus seen to outperform all the other materials, expecially at low uranium solution concentrations. Ionex IRA-400 is a commercially used ion exchange resin, available from Rohm and Haas Co. Activated carbon F-400 is known commercially as Filtrasorb-400, available from Calgon Co.

Figure 2:
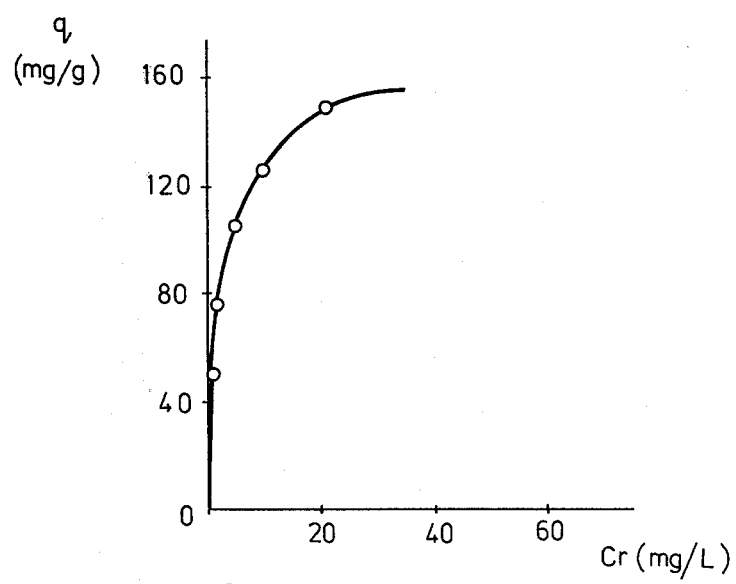

FIG. 2 is a plot similar to FIG. 1, of results obtained performing similar experiments on a standard thorium solution as previously described. At pH 4 and pH 5, the uptake range of the biomass of *Rhizopus arrhizus* for thorium surpasses 150 mg/g, although it is somewhat less for pH 2.

Table II shows comparative uptake figures for thorium for various materials, similarly to those shown in Table I.

TABLE I

| Residual Concentration Mg/L | SORBENT MATERIAL | | | | | | | | |
|---|---|---|---|---|---|---|---|---|---|
| | *Aspergillus Terreus*, biomass | *Pseudomonas Fluorescens* biomass | *Aspergillus Niger* biomass | *Streptomyces Niveus* biomass | Municipal Activated Sludge | Phenolic Activated Sludge | *Rhizopus Arrhizus* biomass | Ionex IRA-400 | Activated Carbon F-400 |
| 5 | 1 | 1 | 6 | 11 | 5 | 11 | 60 | 30 | 15 |
| 30 | 1 | 6 | 13 | 18 | 12 | 26 | 135 | 45 | 34 |
| 700 | 1 | 6 | 31 | 40 | 45 | 78 | 180 | 79 | 145 |

TABLE II

| Residual Concentration Mg/L | SORBENT MATERIAL | | | | | | | | |
|---|---|---|---|---|---|---|---|---|---|
| | *Aspergillus Terrus*, biomass | *Pseudomonas Fluorescens* biomass | *Aspergillus Niger*, biomass | *Streptomyces Niveus* biomass | Municipal Activated Sludge | Phenolic Activated Sludge | *Rhizopus Arrhizus* biomass | Ionex IRA-400 | Activated Carbon F-400 |
| 5 | 2 | 8 | 11 | 16 | 29 | 33 | 105 | 3 | 20 |
| 30 | 7 | 13 | 17 | 27 | 46 | 51 | 147 | 8 | 61 |
| 70 | 8 | 15 | 22 | 34 | 47 | 51 | >147 | 13 | >61 |

We claim:

1. A process for the extraction of uranium- and/or thorium-containing cations from aqueous suspension or solution, which comprises contacting an aqueous solution or suspension containing at least one of said cations with an effective amount of a biomass effective to absorb large quantities of at least one of said cations, said biomass being derived from the growth of a Rhizopus fungal microorganism.

2. The process of claim 1 wherein the biomass is derived from growth of the species *Rhizopus arrhizus*.

3. The process of claim 2 wherein said contacting takes place at a pH in the range from about pH 2.5 to about pH 7.

4. The process of claim 3 wherein the biomass is sterile at the time of initial contact with said solution or suspension.

5. The process of claim 4 wherein the amount of biomass used is from about 5 parts by dry weight to about 20 parts by dry weight, per part by weight of uranium or thorium in the aqueous solution or suspension.

* * * * *